US008365585B2

(12) United States Patent
Barra et al.

(10) Patent No.: US 8,365,585 B2
(45) Date of Patent: Feb. 5, 2013

(54) METHOD TO DETERMINE THE FUEL TEMPERATURE IN A COMMON RAIL INJECTION SYSTEM

(75) Inventors: Gregory Barra, La Roque d'Antheron (FR); Morgan Bonnet, Regensburg (DE); Hui Li, Regensburg (DE); Jingyong Zhang, Shanghai (CN)

(73) Assignee: Continental Automotive GmbH, Hannover (DE)

( * ) Notice: Subject to any disclaimer, the term of this patent is extended or adjusted under 35 U.S.C. 154(b) by 655 days.

(21) Appl. No.: 12/265,945

(22) Filed: Nov. 6, 2008

(65) Prior Publication Data
US 2009/0139499 A1 Jun. 4, 2009

(30) Foreign Application Priority Data
Nov. 9, 2007 (EP) .................... 07021801

(51) Int. Cl.
G01M 15/00 (2006.01)
F02D 7/00 (2006.01)
F02D 41/38 (2006.01)
F02M 69/04 (2006.01)
F02M 51/00 (2006.01)

(52) U.S. Cl. ............. 73/114.38; 123/445; 123/464; 123/494; 123/381

(58) Field of Classification Search .......... 701/102, 701/114; 123/434, 445, 456, 447, 464, 494, 123/381, 179.16, 179.17; 73/114.01, 114.38
See application file for complete search history.

(56) References Cited

U.S. PATENT DOCUMENTS

| 4,846,133 | A  | * | 7/1989  | Shiraishi et al. | 123/494  |
|-----------|----|---|---------|------------------|----------|
| 5,586,538 | A  | * | 12/1996 | Barnes           | 123/446  |
| 5,865,158 | A  | * | 2/1999  | Cleveland et al. | 123/478  |
| 6,109,244 | A  | * | 8/2000  | Yamamoto et al.  | 123/478  |
| 6,138,642 | A  |   | 10/2000 | Curran           |          |
| 6,684,153 | B2 | * | 1/2004  | Wada             | 701/114  |
| 6,725,842 | B2 | * | 4/2004  | Matsumoto        | 123/480  |
| 7,143,580 | B2 | * | 12/2006 | Ge               | 60/605.1 |
| 7,255,093 | B2 | * | 8/2007  | Iihoshi et al.   | 123/518  |
| 7,258,110 | B2 | * | 8/2007  | Kojima           | 123/514  |
| 7,263,973 | B2 | * | 9/2007  | Akita et al.     | 123/431  |
| 7,401,596 | B2 | * | 7/2008  | Sykes et al.     | 123/498  |
| 7,418,335 | B2 | * | 8/2008  | Barnes et al.    | 701/103  |
| 7,418,337 | B2 | * | 8/2008  | Toyohara et al.  | 701/104  |
| 7,454,281 | B2 | * | 11/2008 | Hori             | 701/101  |
| 7,706,956 | B2 | * | 4/2010  | Nagase et al.    | 701/104  |
| 7,712,452 | B2 | * | 5/2010  | Matas et al.     | 123/456  |

(Continued)

FOREIGN PATENT DOCUMENTS
CN 101061303 A 10/2007
DE 3832101 C2 6/1990

(Continued)

OTHER PUBLICATIONS

Chinese Office Action, Chinese Patent Application No. 200810174581.5, 18 pages, Jun. 15, 2012.

Primary Examiner — Nathaniel Wiehe
Assistant Examiner — Tea Holbrook
(74) Attorney, Agent, or Firm — King & Spalding L.L.P.

(57) ABSTRACT

In a method to determine the temperature of a fuel in a common rail injection system of an engine, the fuel temperature at one place of the common rail injection system is calculated from a fuel temperature at another place of the common rail injection system.

19 Claims, 6 Drawing Sheets

U.S. PATENT DOCUMENTS

| | | | |
|---|---|---|---|
| 7,797,098 B2 * | 9/2010 | Kai et al. | 701/104 |
| 7,913,666 B2 * | 3/2011 | Achleitner et al. | 123/447 |
| 7,937,988 B2 * | 5/2011 | Degler et al. | 73/49.7 |
| 7,966,984 B2 * | 6/2011 | Ulrey et al. | 123/179.17 |
| 2001/0032465 A1 * | 10/2001 | Terry et al. | 60/602 |
| 2003/0106534 A1 | 6/2003 | Sollenberger | |
| 2005/0049777 A1 | 3/2005 | Fritsch | |
| 2007/0180896 A1 * | 8/2007 | Storm | 73/116 |
| 2007/0240675 A1 * | 10/2007 | Ban | 123/299 |
| 2007/0277786 A1 * | 12/2007 | Barnes et al. | 123/478 |
| 2008/0006243 A1 * | 1/2008 | Fujii | 123/472 |
| 2009/0112445 A1 * | 4/2009 | Wills | 701/108 |

FOREIGN PATENT DOCUMENTS

| | | |
|---|---|---|
| DE | 4431187 A1 | 3/1996 |
| DE | 10301264 B4 | 9/2006 |
| EP | 1058982 A2 | 4/2001 |
| GB | 2284908 A | 6/1995 |
| GB | 2320338 A | 6/1998 |
| WO | WO 2007142748 A1 | 12/2007 |

* cited by examiner

METHOD TO DETERMINE THE FUEL TEMPERATURE IN A COMMON RAIL INJECTION SYSTEM

CROSS-REFERENCE TO RELATED APPLICATIONS

This application claims priority to EP Patent Application No. 07021801 filed Nov. 9, 2007, the contents of which is incorporated herein by reference in its entirety.

TECHNICAL FIELD

The invention relates to a method and a control unit to determine the fuel-temperature in a direct injection system, in particular a common rail injection system of a vehicle, where fuel is pumped from a tank to a common rail at a high pressure with a high pressure pump and then flows to the injectors that are connected to the common rail.

BACKGROUND

It is known for the operation of an engine to control ignition, fuel injection and other functions of the engine with an engine control unit. Typical input signals for such a controller are, among others, the number of revolutions of the engine per minute, the position of a pedal, e.g. an accelerator pedal as well as the temperature and the pressure of the fuel. With the objective of a precise regulation of the fuel injection in a common rail injection system it is desirable to know the fuel temperature at several places of the common rail injection system, especially to know the fuel temperature inside the common rail and at the position of the injectors.

It is expensive and technically difficult to measure the fuel temperature inside the common rail directly with a temperature sensor. In practice, the fuel temperature has only been determined at the leakage of the injectors. Injectors of the new generation however do not have enough leakage for measuring the temperature with sufficient accuracy. Therefore it is necessary to determine the fuel temperature inside the common rail and the leakage line of the injectors by other means.

The document DE 103 01 264 B4 discloses a method for determining the fuel temperature in a common rail injection system, whereby the pressure of the fuel in the common rail is measured with a pressure sensor, wherein the acoustic velocity of a pressure wave in the fuel is determined, that is created by the injection of fuel and detected by the pressure sensor. The temperature of the fuel is determined with the acoustic velocity of the pressure wave. Moreover the acoustic velocity is determined by the periodic time of the standing pressure wave. This method only allows to determine the fuel temperature in the proximity of the injectors.

The document DE 38 32 101 C2 discloses a method and an apparatus to measure the fuel temperature for electronically controlled engines with a direct injection system. The fuel is injected through injectors in which at least one comprises a needle lift sensor with a sensor coil. The temperature dependent DC resistance of the coil of the needle lift sensor is measured and is taken as a parameter for the fuel temperature. Also this method only allows to determine the fuel temperature at the injectors.

SUMMARY

The fuel temperature can be determined at different positions of a CR-injection system.

According to an embodiment, a method to determine the temperature of a fuel in a common rail injection system of an engine, comprises the step of determining the fuel temperature at one place of the common rail injection system by considering a fuel temperature at another place of the common rail injection system.

According to a further embodiment, a heat exchange between the fuel and its environment can be accounted for the determination of the temperature of the fuel. According to a further embodiment, a heat exchange between the fuel and the engine and/or a heat exchange between the fuel and the air in the environment of the engine and/or a dependency of the heat exchange between the fuel and the environment on a flow speed of the fuel and/or a heat generated by compressing and/or expanding the fuel can be accounted for the determination. According to a further embodiment, the heat exchange between the fuel and the engine may be determined from a fuel temperature at a place of the common rail injection system and a temperature of a cooling water of the engine. According to a further embodiment, the heat exchange between the fuel and the air in the environment of the engine may be determined from a fuel temperature at a place of the common rail injection system, a driving speed of the vehicle and an air temperature in the environment of the vehicle. According to a further embodiment, the dependency of the heat exchange between the fuel and the environment on the flow speed of the fuel may be determined from a fuel temperature at a place of the common rail injection system, a temperature of the cooling water of the engine and the fuel flow speed in the common rail. According to a further embodiment, the heat generated by compressing and expanding the fuel may be determined from a fuel temperature at a place of the common rail injection system and a pressure of the fuel. According to a further embodiment, for the determination of the temperature of the fuel dynamical effects may be accounted by low pass filters. According to a further embodiment, different low pass filters can be used for the cases of the engine warming up and the engine cooling down. According to a further embodiment, for the determination of the temperature of the fuel it may be accounted if the engine was cold started or warm started. According to a further embodiment, a cold start and a warm start of the engine can be distinguished by comparing the difference of the temperature of the cooling water of the engine and the temperature of the air in the environment of the vehicle with a predefined threshold value after the start of the engine. According to a further embodiment, the current values of the temperature of the cooling water of the engine, the temperature of the air in the environment of the vehicle, and the determined values of the temperature of the fuel can be saved to a non-volatile memory before shutting down the engine. According to a further embodiment, in case of a warm start of the engine the time the engine was switched off may be determined from the value of the temperature of the cooling water of the engine before the shut-down of the engine obtained from a non-volatile memory, from a value of a temperature of the cooling water at the start of the engine and from a value of the temperature of the air in the environment of the vehicle. According to a further embodiment, the temperature of the fuel after the start of the engine can be determined from a value of the fuel temperature stored in the non-volatile memory before switching off the engine, a measured value of the temperature of the air in the environment of the vehicle and the time the engine was switched off. According to a further embodiment, after a warm start of the engine the determination of the temperature of the fuel may account the determined value of the temperature of the fuel at the start of the engine for at least some time. According to a further embodiment, the temperature of the fuel in the common rail can be determined. According to a further embodiment, the temperature of the fuel in the leakage line can be determined. According to a further embodiment, the temperature of the fuel in the common rail can be determined from the temperature of the fuel at the inlet of the high pressure pump, and the temperature of the fuel in the leakage line is calculated from the temperature of the fuel in the common rail.

According to another embodiment, a control unit may process any one of the above methods.

BRIEF DESCRIPTION OF THE DRAWINGS

The invention is explained in more detail below on the basis of the Figures, in which.

DETAILED DESCRIPTION

In one embodiment, the fuel temperature at one place of the common rail injection system from a fuel temperature at another place of the common rail injection system is calculated. In one embodiment, the heat exchange between the fuel and the engine, the heat exchange between the fuel and the environment of the engine, the dependency of the heat exchange between the fuel and the environment on the fuel flow speed and the heat generated by compressing and expanding the fuel are correcting factors for this calculation.

The fuel temperature can easily be measured at a point outside the high pressure region. The change of temperature that the fuel experiences while pouring from this point to the injectors can be physically modeled and numerically quantified. Other parameters can be taken into account, for example the temperatures of the engine and the air in the environment, the pressure and the flow speed of the fuel and the driving speed of the vehicle. These quantities are also needed for other functions of the engine control unit and are therefore already determined, therefore leading to no additional expenses. In a simplified embodiment the temperature of the engine can be determined from the temperature of the cooling water.

One advantage of the method according to various embodiments is that the temperature of the fuel can be determined at several locations of the common rail injection system of the engine without available temperature sensors at these locations, which reduces costs and error rate.

Another advantage of the method according to various embodiments is that the fuel temperature can be determined at several locations of the common rail injection system, which allows for a more precise and robust electronic regulation of injection parameters and other parameters. Additionally calibration of those functions of the engine control unit that depend on fuel temperature is simplified by the availability of more precise temperature values.

Figure 1:
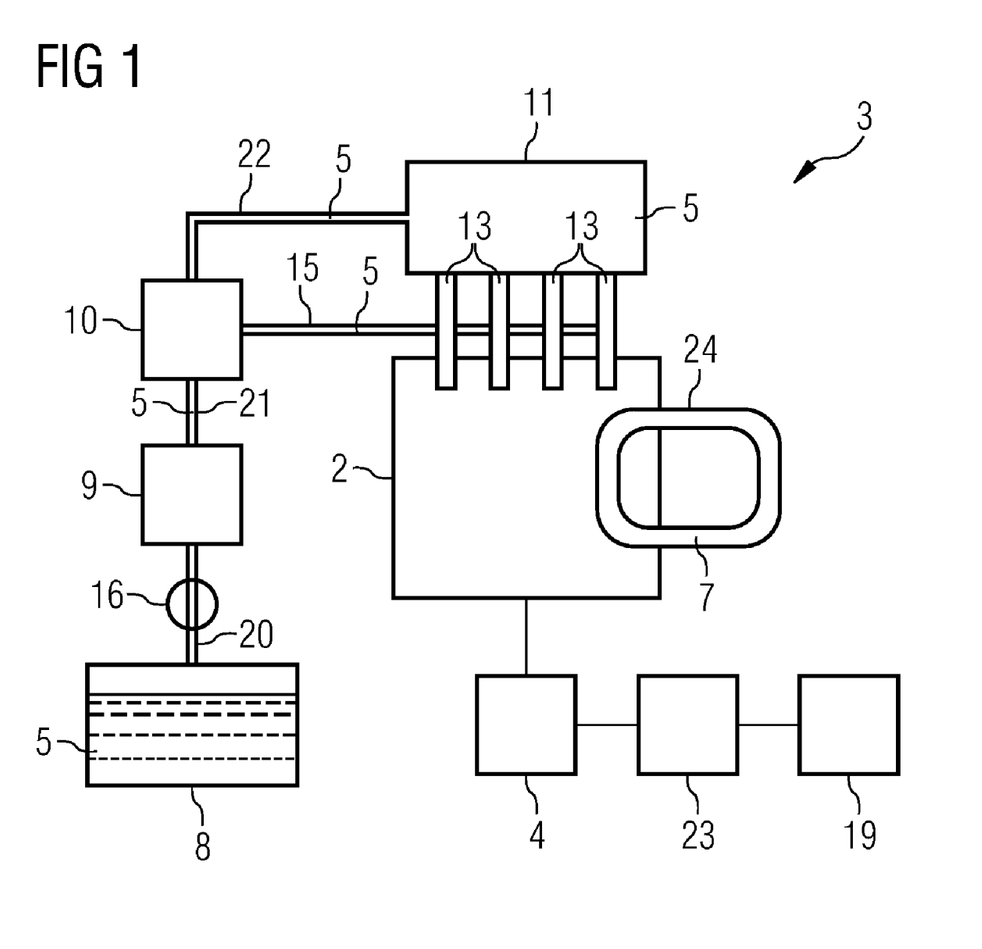
FIG. 1 shows a schematic representation of a common rail injection system.

FIG. 1 shows a schematic representation of a common rail injection system 3 as it can be used with an engine 2. Fuel 5 flows from a tank 8 via a first fuel line 20 to a forepump 9 of a high pressure pump 10. The forepump 9 pumps the fuel 5 via a second fuel line 21 to the high pressure pump 10. The high pressure pump 10 pumps the fuel 5 via a third fuel line 22 at a high pressure FPSP to a common rail 11. From the common rail 11 the fuel 5 is injected into the engine 2 through several injectors 13. A fuel leakage at the injectors 13 is transferred back to the high pressure pump 10 via a leakage line 15.

The engine 2 is connected to a cooling water circulation 24. Cooling water 7 circulating in the cooling water circulation 24 is used to cool the engine 2. The temperature TCO of the cooling water 7 can be used for measuring the temperature of the engine 2.

The engine 2 is connected to an engine control unit 4. The engine control unit 4 is connected to a temperature calculation unit 23. The temperature calculation unit 23 is connected to a non-volatile memory 19. The temperature calculation unit 23 and the non-volatile memory 19 can also be integrated into the engine control unit 4.

The engine control unit 4 regulates various parameters of the engine 2, for example the amount of fuel 5 injected through the injectors 13. Therefore the engine control unit 4 requires values of the temperature of the fuel 5 at several locations of the common rail injection system 3. Inside the first fuel line 20 between the tank 8 and the forepump 9 there is a temperature sensor 16 that allows to measure the temperature TFU of the fuel 5 at this place. Additionally the temperature TFU_RAIL of the fuel in the common rail 11 and the temperature TFU_INJ_LEAK of the fuel 5 in the leakage line 15 are needed. The temperature control unit 23 calculates the temperatures TFU_RAIL and TFU_INJ_LEAK of the fuel 5 from the temperature TFU of the fuel 5 measured with the temperature sensor 16 according to a method described in the following.

Figure 2:
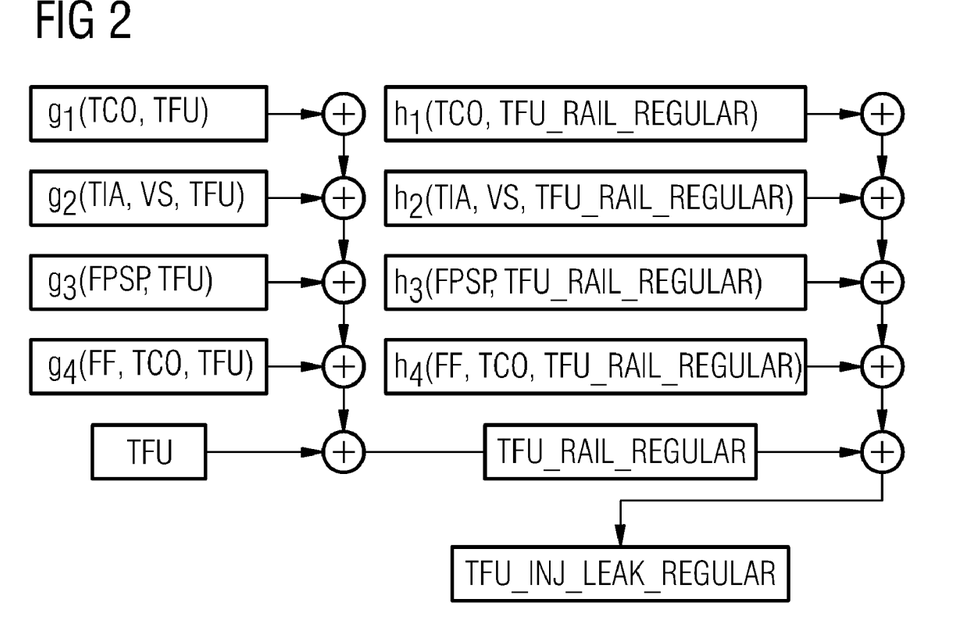
FIG. 2 shows a schematic representation of a method to calculate to fuel temperatures.

A schematic representation of the method used to calculate the temperatures TFU_RAIL and TFU_INJ_LEAK of the fuel 5 is shown in FIG. 2. The temperature TFU of the fuel 5 measured with the temperature sensor 16 in the first fuel line 20 is the starting point. Using a first function g1, a second function g2, a third function g3 and a fourth function g4, four correction values are calculated by a physical model and are representing the temperature difference of the fuel 5 between the first fuel line 20 and the common rail 11. Addition of those four correction values to the temperature TFU measured with the temperature sensor 16 yields the temperature TFU_RAIL_REGULAR of the fuel 5 in the common rail 11. Using a fifth function h1, a sixth function h2, a seventh function h3 and an eighth function h4, further four correction values are calculated by a physical model representing the temperature difference of the fuel 5 between the common rail 11 and the leakage line 15. Addition to those further four correction values to the temperature TFU_RAIL_REGU- LAR in the common rail 11 yields the temperature TFU_INJ_LEAK_REGULAR of the fuel 5 in the leakage line 15. The single procedural steps and the functions g1, g2, g3, g4, h1, h2, h3, h4 will now be explained by means of figures.

Figure 3:
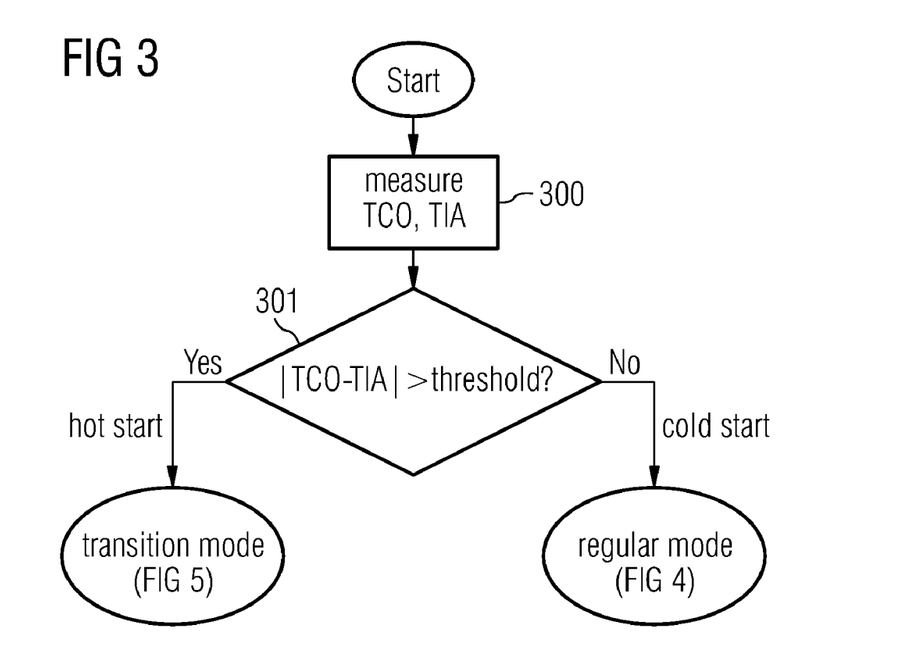
FIG. 3 shows a flow diagram of a distinction between a cold and a warm start of an engine.

As is shown in the flow diagram of FIG. 3, after the start of an engine 2.

In step 300 the temperature TCO of the cooling water 7 of the engine 2 and the temperature TIA of the air at the air inlet of the engine 2 are determined.

In step 301 the difference between the temperatures TCO and TIA is compared to a predefined threshold value, for example 3° C. If the difference between the temperatures TCO and TIA is larger than the threshold value the engine has been warm started and had not fully cooled down since its last operation. In this case the temperature calculation starts in a transition mode displayed in FIG. 5. Otherwise the temperature calculation starts in a regular mode displayed in FIG. 4.

Figure 4:
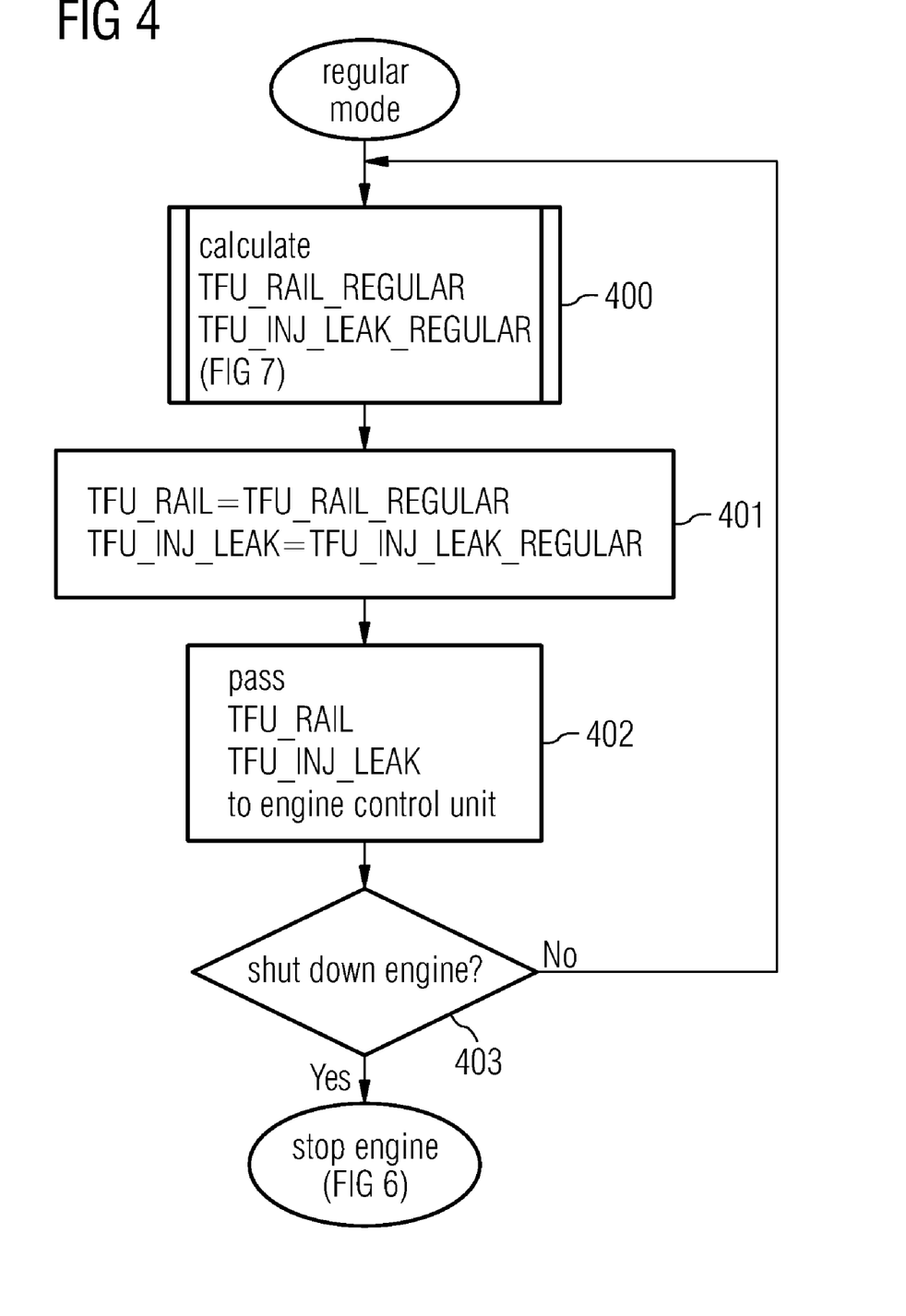
FIG. 4 shows a flow diagram of a calculation of a fuel temperature in normal mode.
Figure 7:
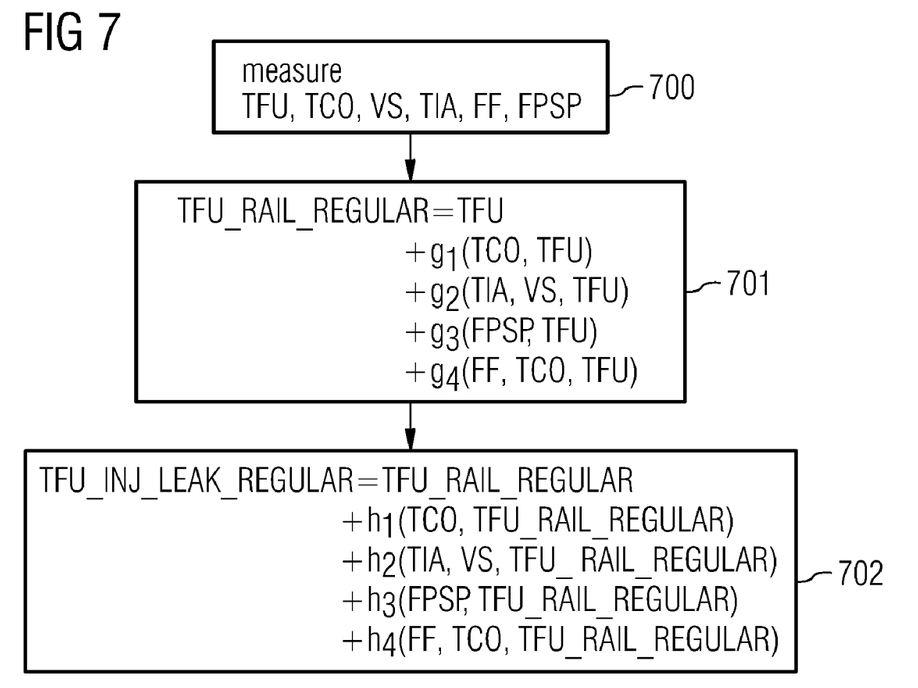
FIG. 7 shows a flow diagram of a temperature calculation.

In the regular mode after a cold start or after a long operation of the engine 2 the fuel temperature is determined, for example calculated, in a repeating loop displayed in the flow diagram of FIG. 4, where the actual calculation is sourced out to a subprogram displayed in FIG. 7 that is called in step 400.

In step 700 in FIG. 7 the fuel temperature TFU in the first fuel line 20, the temperature TCO of the cooling water 7, the temperature TIA of the air at the air inlet of the engine 2, the driving velocity VS of the vehicle, the fuel flow speed FF in the common rail 11 and the fuel pressure FPSP in the common rail are measured and/or determined.

In step 701 the temperature TFU_RAIL_REGULAR of the fuel 5 in the common rail 11 is calculated as the sum of the measured temperature TFU of the fuel in the first fuel line 20 and four changes in temperature, which are calculated from the first, second, third and fourth function g1, g2, g3, and g4.

The first function g1 accounts for the heat exchange between the fuel 5 and the engine 2 as a function of the temperature TCO of the cooling water 7 and the temperature TFU of the fuel 5 in the first fuel line 20. The heat exchange leads to a warming of the fuel 5 and is larger the bigger the difference of the temperatures TCO and TFU is. For example, the first function g1 may return a value for the change of temperature of the fuel 5 that linearly depends on the temperature difference:

$$g1(TCO, TFU) = a1*(TCO-TFU).$$

The difference of the temperatures TCO and TFU is multiplied with a parameter a1 that is determined experimentally and is permanently stored in the temperature calculation unit 23. The parameter can have a value between 0 and 1. Alternatively the first function g1 returns a value for the change of temperature of the fuel 5 that is taken from an experimentally determined table that is permanently stored in the temperature calculation unit 23.

The second function g2 reflects the heat exchange between the fuel 5 and the environment of the engine 2 as a function of temperature TIA of the air at the air inlet of the engine 2 and temperature TFU of the fuel 5 in the first fuel line 20 and the driving velocity VS of the vehicle. The heat exchange leads to a cooling of the fuel 5 and is the larger the larger the difference of temperatures TIA and TFU is and the larger the driving velocity VS of the vehicle is. For example the second function g2 may return a value for the change of fuel temperature that linearly depends on the temperature difference and the driving velocity VS:

$$g2(TIA, VS, TFU) = (TIA-TFU)*(a2+b2*VS).$$

Parameters a2 and b2 are determined experimentally and permanently stored in the temperature calculation unit 23. Parameter a2 has a value larger than 0, parameter b2 has a value between 0 and 1 and a unit of an inverse velocity. Parameter a2 is added to the driving velocity VS multiplied with parameter b2. The result is multiplied with the difference of temperatures TIA and TFU. Alternatively the second function g2 returns a value for the change of temperature that is taken from an experimentally determined table that is permanently stored in the temperature calculation unit 23.

The third function g3 reflects the heat supplied by compressing and expanding the fuel 5 as a function of the fuel pressure FPSP in the common rail 11 and the temperature TFU of the fuel 5 in the first fuel line 20. The third function g3 returns a value for the change of temperature that is taken from an experimentally determined table that is permanently stored in the temperature calculation unit 23.

The fourth function g4 reflects the dependency of the change of temperature of the fuel 5 on the fuel flow speed FF in the common rail 11 as a function of the fuel flow speed FF in the common rail 11 and the temperature TCO of the cooling water 7 of the engine 2 and the temperature TFU of the fuel 5 in the first fuel line 20. The change of temperature is the larger the larger the difference of temperatures TCO and TFU is and the smaller the larger the fuel flow speed FF is. For example the fourth function g4 may return a value for the change of temperature of the fuel 5 that linearly depends on the ratio of the temperature difference and the fuel flow speed FF:

$$g4(FF, TCO, TFU) = (a4/FF)*(TCO-TFU).$$

Parameter a4 is determined experimentally and is permanently stored in the temperature calculation unit 23. It has the unit of an inverse velocity. Parameter a4 is divided by the fuel flow speed FF and multiplied with the difference of temperatures TCO and TFU. Alternatively the fourth function g4 returns a change of temperature of the fuel 5 that is taken from an experimentally determined table that is permanently stored in the temperature calculation unit 23.

All four functions g1, g2, g3, and g4 have as output values temperature differences. These four differences are added to the temperature TFU of the fuel 5 in the first fuel line 20 in step 701. The result is the temperature TFU_RAIL_REGULAR of the fuel 5 in the common rail 11.

In step 702 the temperature TFU_INJ_LEAK_REGULAR of the fuel 5 in the leakage line 15 is calculated as the sum of the temperature TFU_RAIL_REGULAR of the fuel 5 in the common rail 11 calculated before and four changes of temperature that are calculated with a fifth, a sixth, a seventh and an eighth function h1, h2, h3, and h4.

The fifth function h1 reflects the heat exchange between the fuel 5 and the engine 2 as a function of temperature TCO of the cooling water 7 and temperature TFU_RAIL_REGULAR of the fuel 5 in the common rail 11. The heat transfer leads to a warming of the fuel 5 and is the larger the larger the difference of temperatures TCO and TFU_RAIL_REGULAR is. For example the fifth function h1 may return a change of temperature that linearly depends on the temperature difference:

$$h1(TCO, TFU\_RAIL\_REGULAR) = c1*(TCO-TFU\_RAIL\_REGULAR).$$

The difference of the temperatures TCO and TFU_RAIL_REGULAR is multiplied with a parameter c1 that is determined experimentally and is permanently stored in the temperature calculation unit 23. It has a value between 0 and 1. Alternatively the fifth function h1 returns a value for the change of temperature that is taken from an experimentally determined table that is permanently stored in the temperature calculation unit 23.

The sixth function h2 reflects the heat exchange between the fuel 5 and the environment of the engine 2 as a function of temperature TIA of the air at the air inlet of the engine 2 and temperature TFU_RAIL_REGULAR of the fuel 5 in the common rail 11 and the driving velocity VS of the vehicle. The heat transfer leads to a cooling of the fuel 5 and is the larger the larger the difference of temperatures TIA and TFU_RAIL_REGULAR is and the larger the driving velocity VS of the vehicle is. For example the sixth function h2 may return a value for the change of temperature that linearly depends on the temperature difference and the driving velocity VS:

$$h2(TIA, VS, TFU\_RAIL\_REGULAR) = (TIA - TFU\_RAIL\_REGULAR) * (c2 + d2 * VS).$$

Parameters c2 and d2 are determined experimentally and are permanently stored in the temperature calculation unit 23. Parameter c2 has a value larger than 0, parameter d2 has a value between 0 and 1 and a unit of an inverse velocity. Parameter c2 is added to the driving velocity VS multiplied with parameter d2. The result is multiplied with the difference of temperatures TIA and TFU_RAIL_REGULAR. Alternatively the sixth function h2 returns a value for the change of temperature of the fuel 5 that is taken from an experimentally determined table that is permanently stored in the temperature calculation unit 23.

The seventh function h3 reflects the heat transferred to the fuel 5 by compressing and expanding the fuel 5 as a function of the fuel pressure FPSP in the common rail 11 and as a function of the temperature TFU_RAIL_REGULAR of the fuel 5 in the common rail 11. The seventh function h3 returns a value for the change of temperature of the fuel 5 that is taken from an experimentally determined table that is permanently stored in the temperature calculation unit 23.

The eighth function h4 reflects the dependency of the change of temperature of the fuel 5 on the fuel flow speed FF in the common rail 11 as a function of the fuel flow speed FF in the common rail 11 and as a function of the temperature TCO of the cooling water 7 of the engine 2 and as a function of the temperature TFU_RAIL_REGULAR of the fuel 5 in the common rail 11. The heat transfer leads to a warming of the fuel 5 and is the larger the larger the difference of temperatures TCO and TFU_RAIL_REGULAR is and the smaller the larger the fuel flow speed FF is. For example the eighth function h4 may return a value for the change of temperature of the fuel 5 that linearly depends on the ratio of the temperature difference and the fuel flow speed FF:

$$h4(FF, TCO, TFU\_RAIL\_REGULAR) = (c4/FF) * (TCO - TFU\_RAIL\_REGULAR).$$

Parameter c4 is determined experimentally and is permanently stored in the temperature calculation unit 23. It has the unit of a velocity. Parameter c4 is divided by the fuel flow speed FF and multiplied with the difference of temperatures TCO and TFU_RAIL_REGULAR. Alternatively the eighth function h4 returns a value for the change of temperature that is taken from an experimentally determined table that is permanently stored in the temperature calculation unit 23.

The fifth, sixth, seventh and eighth functions h1, h2, h3, and h4 return values for the change of temperature in degrees Centigrade. These values are added to the calculated temperature TFU_RAIL_REGULAR of the fuel 5 in the common rail 11 in step 702. The result is the temperature TFU_INJ_LEAK_REGULAR of the fuel 5 in the leakage line 15.

Functions g1, g2, g3, g4, and h1, h2, h3, h4 may be realized as low pass filters to account for a delayed effect of the changes of temperature due to the various mechanisms of heat exchange described above. To this end, functions g1, g2, g3, g4, and h1, h2, h3, h4 may make use of specific data storage units and data tables if necessary. To account whether the engine 2 is currently warming up or cooling down, low pass filters with different characteristics can be used. Also a pressure gradient of the fuel 5 can be taken into account by adjusting the characteristics of the low pass filters.

In a regular mode the values TFU_RAIL_REGULAR and TFU_INJ_LEAK_REGULAR calculated as described above, are taken as the real temperatures TFU_RAIL and TFU_INJ_LEAK of the fuel 5 in the common rail 11 and the leakage line 15 in step 401 and are passed to the engine control unit 4 in step 402.

Figure 6:
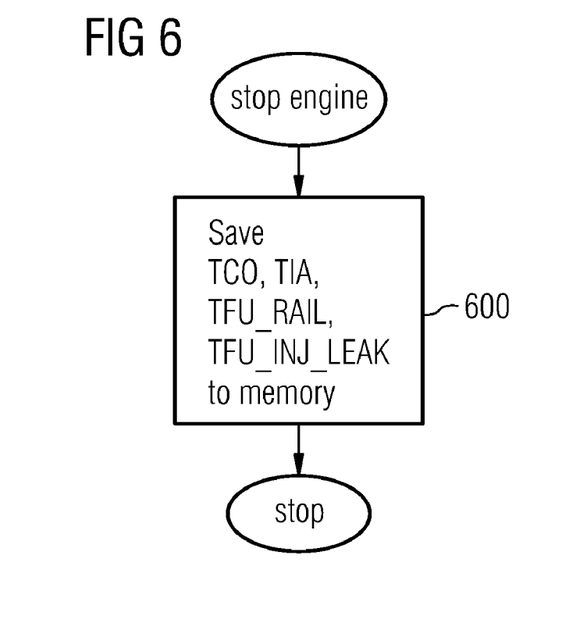
FIG. 6 shows a flow diagram of a data saving before a shut-down of the engine.

In step 403 it is checked if the engine 2 is to be switched off. If so the process ends as shown in FIG. 6 and described below. Otherwise activity jumps back to a new calculation of fuel temperatures in step 400.

In case of a warm start of the engine 2, there are leftovers of hot fuel 5 in the common rail 11, which have to be taken into account for the calculation of fuel temperatures. Therefore in case of a warm start of the engine 2, the calculation of fuel temperatures starts in a transition mode that is displayed in FIG. 5. First, in step 500 the values of the temperature TCO_STOP of the cooling water 7, the temperature TIA_STOP of the air, the temperature TFU_RAIL STOP of the fuel 5 in the common rail 11 and the temperature TFU_INJ_LEAK_STOP of the fuel 5 in the leakage line 15, that have been stored in the non-volatile memory 19 before the last shut-down of the engine 2, are read back.

Figure 5:
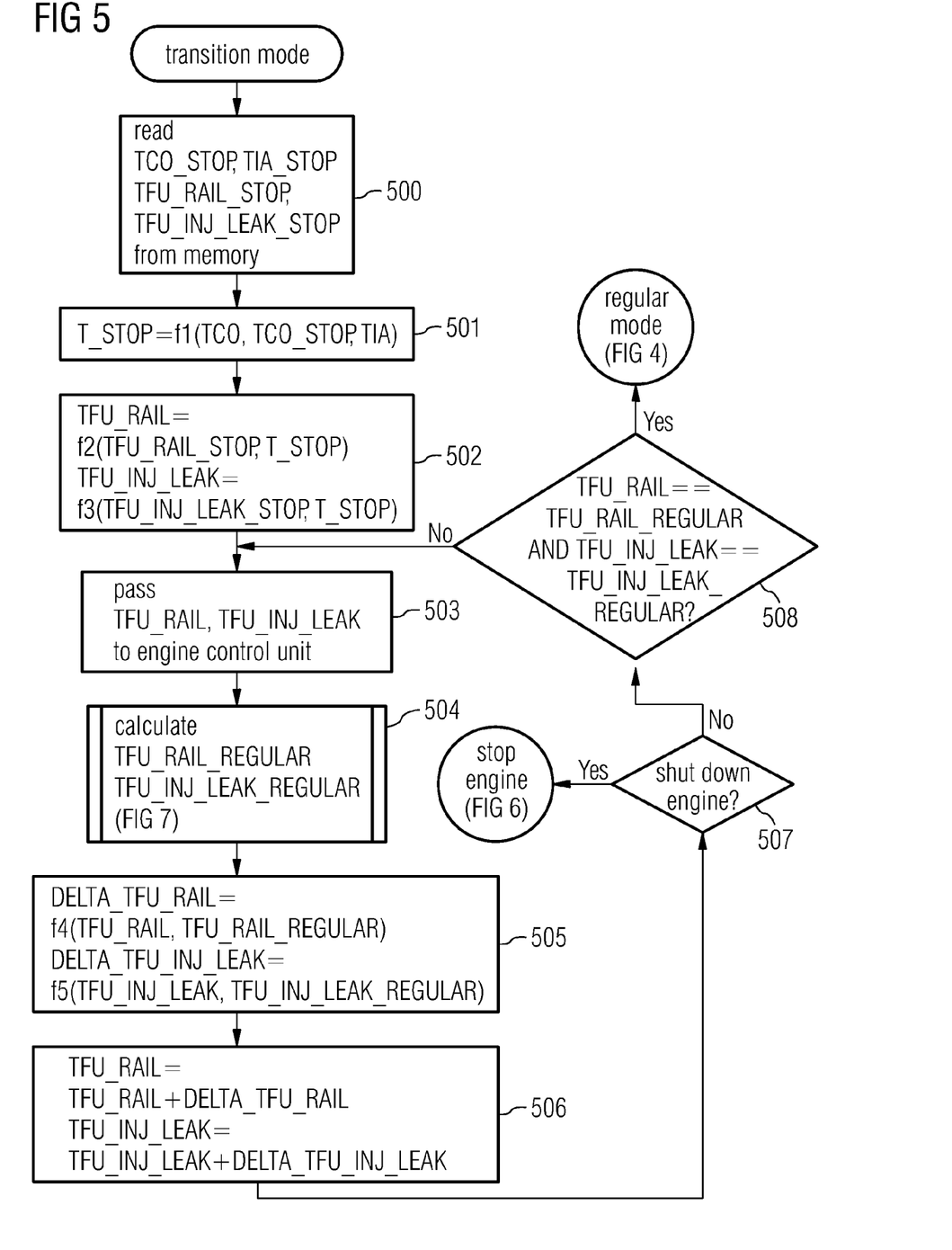
FIG. 5 shows a flow diagram of a transition mode for a calculation of a fuel temperature after a warm start of the engine.
Figure 8:
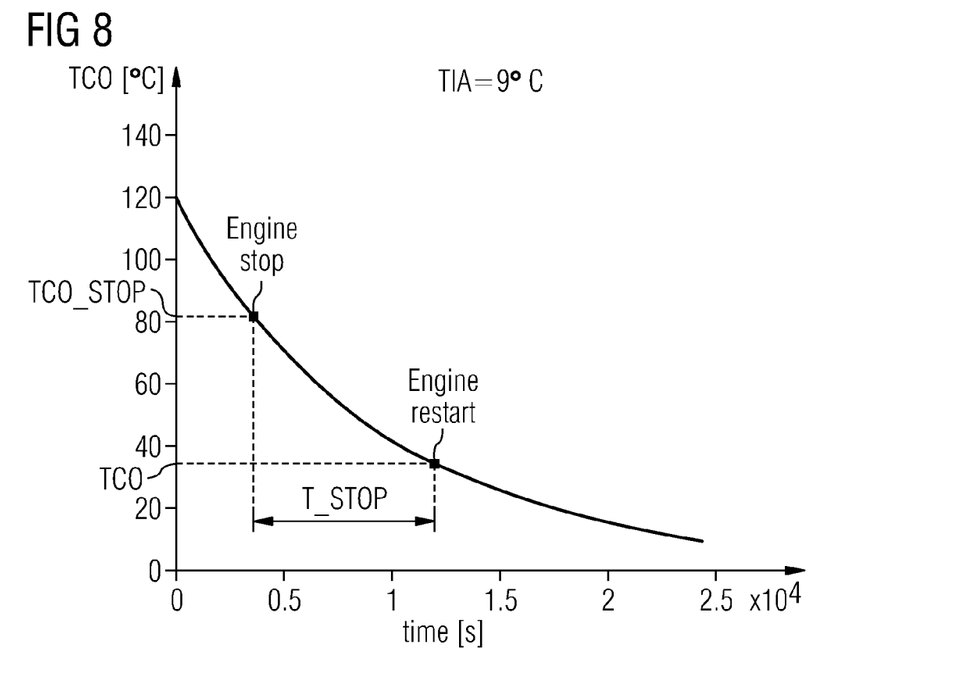
FIG. 8 shows a diagram of the characteristics of a cool-down of the cooling water of the engine after a shut-down of the engine at a certain temperature of the air in the environment of the vehicle.

In step 501 the time T_STOP since the last switch-off of the engine 2 is calculated from the current temperature TCO of the cooling water 7, the temperature TCO_STOP of the cooling water 7 before the last switch-off of the engine 2 and the temperature TIA of the air in the environment of the engine 2 with a ninth function f1. The ninth function f1 can determine the time T_STOP since the last switch-off of the engine 2 according to provided data of the cooling down of the cooling water 7 at various temperatures of the air in the environment. An example of such data for a temperature TIA of the air in the environment of the engine 2 of 9° C. is shown as a diagram in FIG. 8, where the x-axis shows the time passed since the switch-off of engine 2, and the y-axis shows the temperature of the cooling water 7. The intercept of the x-axis between the temperature TCO_STOP of the cooling water 7 before the switch-off of engine 2 and the temperature TCO of the cooling water 7 after the new start of the engine 2 corresponds to the time T_STOP since the last switch-off of the engine 2. Alternatively, the ninth function f1 can calculate the time T_STOP with a formula that describes the dependency of the cooling down of the cooling water 7 on the temperature TIA of the air in the environment of the engine 2 with an exponential decay or another suitable expression. The temperature TIA of the air in the environment of the engine 2 can be the temperature TIA measured in step 300 at the start of the engine 2. Alternatively it can be the value TIA_STOP of the air in the environment of the engine 2 before the last switch-off of the engine 2 that is taken from the non-volatile memory 19 in step 500. It can also be an average value calculated from the values TIA and TIA_STOP.

Figure 9:
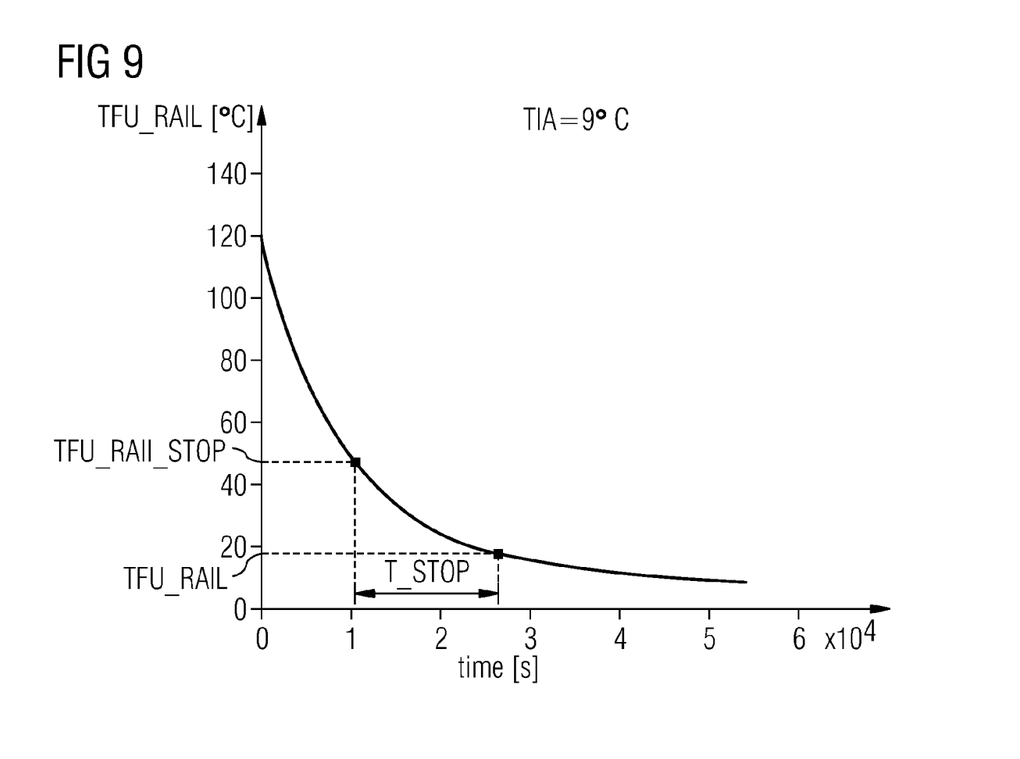
FIG. 9 shows a diagram of the characteristics of the cool-down of the fuel in the common rail after a shut-down of the engine at a certain temperature of the air in the environment of the vehicle.

The time T_STOP since the last switch-off of the engine 2 and the temperature TFU_RAIL STOP of the fuel 5 in the common rail 11 before the last switch-off of the engine 2 are used to calculate the temperature TFU_RAIL of the fuel 5 in the common rail 11 after the new start of the engine 2 with a tenth function f2 in step 502. To this end, the tenth function f2 can use provided data of the cooling down of the fuel 5 in the common rail 11, similar to the previous step 501. An example of such a data of the cooling down of the fuel 5 in the common rail 11 after the switch-off of the engine 2 is shown in FIG. 9. Alternatively the tenth function f2 can calculate the temperature TFU_RAIL of the fuel 5 in the common rail 11 with a mathematical expression, for example an exponential decay.

In step 502 also the temperature TFU_INJ_LEAK of the fuel 5 in the leakage line 15 after the new start of the engine 2 is calculated from the time T_STOP since the last switch-off of the engine 2 and the temperature TFU_INJ_LEAK_STOP of the fuel 5 in the leakage line 15 before the last switch-off of the engine 2 with an eleventh function f3. To this end the eleventh function f3 can use provided data of the cooling down of the fuel 5 in the leakage line 15, similar as in the previous steps. Alternatively the eleventh function f3 can calculate the temperature TFU_INJ_LEAK of the fuel 5 in the leakage line 15 with a mathematical expression, for example an exponential decay.

In step 503 the values TFU_RAIL and TFU_INJ_LEAK, calculated in step 502, are passed to the engine control unit 4 to be used in regulation.

In step 504 the subprogram displayed in FIG. 7 and explained above that calculates the temperatures TFU_RAIL_REGULAR and TFU_INJ_LEAK_REGULAR of the fuel 5 in the common rail 11 and the leakage line 15 is called.

Because of the already mentioned warm fuel 5 in the common rail 11 remaining from the last operation of the engine 2 the values TFU_RAIL and TFU_INJ_LEAK calculated in step 502 will in general differ from the values TFU_RAIL_REGULAR and TFU_INJ_LEAK_REGULAR calculated in step 504. Therefore the values TFU_RAIL and TFU_INJ_LEAK passed to the engine control unit 4 will be stepwise ramped towards the values TFU_RAIL_REGULAR and TFU_INJ_LEAK_REGULAR now.

To this end the quantity DELTA_TFU_RAIL of the next step is calculated with a twelfth function f4 from the values TFU_RAIL and TFU_RAIL_REGULAR in step 505. The size of the step DELTA_TFU_RAIL given by the twelfth function f4 determines the duration of the transition mode during which TFU_RAIL is changed towards TFU_RAIL_REGULAR. The larger the step DELTA_TFU_RAIL is the fewer steps are performed during the transition mode. If the transition mode should take 5 minutes and 10 steps per second are performed, then 3000 steps have to be performed altogether. Accordingly, DELTA_TFU_RAIL is calculated as the difference between TFU_RAIL_REGULAR and TFU_RAIL divided by 3000.

In step 505 also the quantity DELTA_TFU_INJ_LEAK is calculated from the value TFU_INJ_LEAK and TFU_INJ_LEAK_REGULAR with a thirteenth function f5. The magnitude of the value DELTA_TFU_INJ_LEAK given by the thirteenth function f5 determines the duration of the transition mode, during which the value TFU_INJ_LEAK is changed towards the value TFU_INJ_LEAK_REGULAR. Calculation of the value DELTA_TFU_INJ_LEAK follows the same considerations as the calculation of the value DELTA_TFU_RAIL described above.

In step 506 the value TFU_RAIL is changed towards the value TFU_RAIL_REGULAR by the value DELTA_TFU_RAIL calculated in step 505 by adding the value DELTA_TFU_RAIL to the value TFU_RAIL.

Also in step 506 the value TFU_INJ_LEAK is changed towards the value TFU_INJ_LEAK_REGULAR by the value DELTA_TFU_INJ_LEAK calculated in step 505 by adding the value DELTA_TFU_INJ_LEAK to the value TFU_INJ_LEAK.

Next it is checked in step 507 if the engine 2 is to be switched off. In this case the process ends as shown in FIG. 6 and described below. Otherwise it is checked in step 508 if the values TFU_RAIL and TFU_INJ_LEAK have reached the values TFU_RAIL_REGULAR and TFU_INJ_LEAK_REGULAR. If so, the process continues with the calculation of fuel temperatures in regular mode in FIG. 4 as described above.

Otherwise the process continues in transition mode in step 503 with passing the values TFU_RAIL and TFU_INJ_LEAK to the engine control unit 4.

If the checks in step 403 or 507 have shown that the engine 2 is to be switched-off, the process continues as shown in FIG. 6. In step 600 the temperature TCO of the cooling water 7 of the engine 2, the temperature TFU_RAIL of the fuel 5 in the common rail 11, the temperature TFU_INJ_LEAK of the fuel 5 in the leakage line 15 and the temperature TIA of the air at the air inlet of the engine 2 are stored in the non-volatile memory 19 to be utilized again after the next start of the engine 2. Then the calculation of the fuel temperatures TFU_RAIL and TFU_INJ_LEAK ends and the engine 2 can be switched-off.

What is claimed is:

1. A method to determine temperature of a fuel in a common rail injection system of an engine, comprising
determining fuel temperature in a common rail based on a fuel temperature measured by a temperature sensor located upstream from the fuel rail with at least one fuel pump arranged in line between the temperature sensor and the common rail;
wherein the determination of the fuel temperature in the common rail includes:
determining whether the engine was cold started or warm started based on a comparison of a determined temperature of cooling water in the engine and a determined air temperature at an air inlet of the engine, and
in response to determining a warm start of the engine, accounting for leftovers of hot fuel in the common rail in the determination of the fuel temperature in the common rail.

2. The method according to claim 1, wherein a heat exchange between the fuel and its environment is accounted for the determination of the temperature of the fuel.

3. The method according to claim 2, wherein the heat exchange between the fuel and the engine is determined from a fuel temperature at a place of the common rail injection system and a temperature of a cooling water of the engine.

4. The method according to claim 2, wherein the heat exchange between the fuel and the air in the environment of the engine is determined from a fuel temperature at a place of the common rail injection system, a driving speed of the vehicle and an air temperature in the environment of the vehicle.

5. The method according to claim 2, wherein the dependency of the heat exchange between the fuel and the environment on the flow speed of the fuel is determined from a fuel temperature at a place of the common rail injection system, a temperature of the cooling water of the engine and the fuel flow speed in the common rail.

6. The method according to claim 2, wherein the heat generated by compressing and expanding the fuel is determined from a fuel temperature at a place of the common rail injection system and a pressure of the fuel.

7. The method according to claim 1, wherein for determination of said fuel temperature at least one of the following is selected from the group consisting of: a heat exchange between the fuel and the engine, a heat exchange between the fuel and the air in the environment of the engine, a dependency of the heat exchange between the fuel and the environment on a flow speed of the fuel, a heat generated by compressing, and expanding the fuel.

8. The method according to claim 7, wherein for the determination of the temperature of the fuel dynamical effects are accounted by low pass filters.

9. The method according to claim 8, wherein different low pass filters are used for the cases of the engine warming up and the engine cooling down.

10. The method according to claim 1, wherein a cold start and a warm start of the engine are distinguished by comparing the difference of the temperature of the cooling water of the engine and the temperature of the air in the environment of the vehicle with a predefined threshold value after the start of the engine.

11. The method according to claim 10, wherein the current values of the temperature of the cooling water of the engine, the temperature of the air in the environment of the vehicle, and the determined values of the temperature of the fuel are saved to a non-volatile memory before shutting down the engine.

12. The method according to claim 10, wherein accounting for leftovers of hot fuel in the common rail in the determination of the fuel temperature in the common rail in response to determining a warm start of the engine comprises calculating a time at which the engine was previously switched off based on a stored value of a temperature of the cooling water of the engine before the previous switch-off of the engine, a value of a temperature of the cooling water at the start of the engine, and a value of the temperature of the air in the environment of the vehicle.

13. The method according to claim 12, wherein the temperature of the fuel after the start of the engine is determined from a value of the fuel temperature stored in the non-volatile memory before switching off the engine, a measured value of the temperature of the air in the environment of the vehicle and the time the engine was switched off.

14. The method according to claim 12, wherein after a warm start of the engine the determination of the temperature of the fuel accounts the determined value of the temperature of the fuel at the start of the engine for at least some time.

15. The method according to claim 1, wherein the temperature of the fuel in the leakage line is determined.

16. The method according to claim 15, wherein the temperature of the fuel in the leakage line is calculated from the temperature of the fuel in the common rail.

17. A control unit for determining temperature of a fuel in a common rail injection system of an engine, the control unit being operable to:
 determine fuel temperature in a common rail based on a fuel temperature measured by a temperature sensor located upstream from the fuel rail with at least one fuel pump arranged in line between the temperature sensor and the common rail;
 wherein the determination of the fuel temperature in the common rail includes:
  determining whether the engine was cold started or warm started based on a comparison of a determined temperature of cooling water in the engine and a determined air temperature at an air inlet of the engine, and
  in response to determining a warm start of the engine, accounting for leftovers of hot fuel in the common rail in the determination of the fuel temperature in the common rail.

18. The control unit according to claim 17, wherein a heat exchange between the fuel and its environment is accounted for the determination of the temperature of the fuel.

19. The control unit according to claim 17, further operable to calculate a time at which the engine was previously switched off based on (a) a stored value of a temperature of the cooling water of the engine before the previous switch-off of the engine, (b) a value of a temperature of the cooling water at the start of the engine, and (c) a value of the temperature of the air in the environment of the vehicle.

* * * * *